(12) United States Patent
Collet et al.

(10) Patent No.: US 11,386,682 B2
(45) Date of Patent: Jul. 12, 2022

(54) IMAGE PROCESSING SYSTEM AND AN IMAGE PROCESSING METHOD

(71) Applicant: I.R.I.S., Mont-Saint-Guibert (BE)

(72) Inventors: Frédéric Collet, Etterbeek (BE); Jordi Hautot, Neupre (BE); Michel Dauw, Machelen (BE)

(73) Assignee: I.R.I.S, Mont-Saint-Guibert (BE)

( * ) Notice: Subject to any disclaimer, the term of this patent is extended or adjusted under 35 U.S.C. 154(b) by 19 days.

(21) Appl. No.: 16/354,030

(22) Filed: Mar. 14, 2019

(65) Prior Publication Data

US 2019/0303702 A1 Oct. 3, 2019

(30) Foreign Application Priority Data

Mar. 28, 2018 (GB) ..................................... 1805039

(51) Int. Cl.
*G06K 9/34* (2006.01)
*G06V 30/148* (2022.01)
(Continued)

(52) U.S. Cl.
CPC ............. *G06V 30/153* (2022.01); *G06N 3/08* (2013.01); *G06N 20/00* (2019.01); *G06V 10/242* (2022.01);
(Continued)

(58) Field of Classification Search
CPC .. G06K 9/344; G06K 9/3275; G06K 9/00342; G06K 9/3208; G06K 9/00463; G06K 9/03; G06K 2209/01; G06K 9/3233; G06K 9/00442; G06N 20/00; G06N 3/08; G06T 7/70
See application file for complete search history.

(56) References Cited

U.S. PATENT DOCUMENTS 4,679,951 A * 7/1987 King .......................... B41J 3/01
345/168
5,803,629 A * 9/1998 Neville .................. G06F 40/109
400/304
(Continued)

FOREIGN PATENT DOCUMENTS

EP 0684576 A2 11/1995
EP 2159736 A2 3/2010
(Continued)

OTHER PUBLICATIONS

IBM (EP 0684576) (Year: 1995).*

*Primary Examiner* — Solomon G Bezuayehu
(74) *Attorney, Agent, or Firm* — Canon U.S.A., Inc. IP Division

(57) ABSTRACT

An image processing system and an image processing method for localising recognised characters in an image. An estimation unit is configured to estimate a first location of a recognised character that has been obtained by performing character recognition of the image. A determination unit is configured to determine second locations of a plurality of connected components in the image. A comparison unit is configured to compare the first location and the second locations, to identify a connected component associated with the recognised character. An association unit is configured to associate the recognised character, the identified connected component, and the second location of the identified connected component.

15 Claims, 10 Drawing Sheets

(51) Int. Cl.
  *G06N 20/00*     (2019.01)
  *G06N 3/08*      (2006.01)
  *G06V 10/24*     (2022.01)
  *G06V 30/414*    (2022.01)
  *G06V 40/20*     (2022.01)
  *G06V 10/98*     (2022.01)
  *G06V 30/10*     (2022.01)

(52) U.S. Cl.
  CPC .......... *G06V 10/243* (2022.01); *G06V 30/414* (2022.01); *G06V 40/23* (2022.01); *G06V 10/98* (2022.01); *G06V 30/10* (2022.01)

(56) References Cited

U.S. PATENT DOCUMENTS

| | | | | |
|---|---|---|---|---|
| 8,442,813 | B1* | 5/2013 | Popat | G06F 40/253 |
| | | | | 704/9 |
| 9,147,275 | B1* | 9/2015 | Hyde-Moyer | G06V 10/987 |
| 9,384,409 | B1* | 7/2016 | Ming | G06V 30/158 |
| 10,423,852 | B1* | 9/2019 | Sarraf | G06K 9/6267 |
| 2010/0104130 | A1* | 4/2010 | Harada | G06V 30/158 |
| | | | | 382/100 |
| 2010/0169077 | A1* | 7/2010 | Yang | G06V 30/153 |
| | | | | 704/9 |
| 2010/0232690 | A1* | 9/2010 | Kanatsu | G06F 16/93 |
| | | | | 707/758 |
| 2013/0034302 | A1* | 2/2013 | Sata | G06V 30/158 |
| | | | | 382/182 |
| 2013/0121579 | A1* | 5/2013 | Cowley | G06K 9/00 |
| | | | | 382/176 |
| 2014/0003649 | A1* | 1/2014 | Wang | G06T 1/0021 |
| | | | | 382/100 |
| 2015/0086113 | A1* | 3/2015 | Chattopadhyay | G06K 9/342 |
| | | | | 382/178 |
| 2015/0248235 | A1* | 9/2015 | Offenberg | G06F 3/017 |
| | | | | 715/773 |
| 2015/0262030 | A1 | 9/2015 | Kawabata et al. | |
| 2016/0292501 | A1* | 10/2016 | Higashi | G06V 30/158 |
| 2016/0307061 | A1* | 10/2016 | Bulan | G06K 9/6256 |
| 2016/0313881 | A1 | 10/2016 | Lehoux | |
| 2016/0328366 | A1* | 11/2016 | Elarian | G06V 30/153 |
| 2017/0032210 | A1* | 2/2017 | Deppieri | G06K 9/348 |
| 2017/0255983 | A1* | 9/2017 | McCluskey | G06Q 30/06 |
| 2018/0033147 | A1* | 2/2018 | Becker | G06K 9/00449 |
| 2018/0082123 | A1* | 3/2018 | Katz | G06K 9/00724 |

FOREIGN PATENT DOCUMENTS

| | | |
|---|---|---|
| JP | H03179585 A | 8/1991 |
| JP | H08305804 A | 11/1996 |

* cited by examiner

400

410 Tel: +32 (0)

420 Fax: +32

430 E-mail:

FIG. 4

410 — Tel: +32 (0)

420 — Fax: +32

430 — E-mail:

| Connected Component | Recognised Character | Blob | |
|---|---|---|---|
| T | T | T T | 810 |
| ■ ■ | . . | ■ . ■ . | 820 |
| 2 2 | 2 | 2 2 | 830 |
| +3 +3 | + 3 | +3 +3 | 840 |
| +3 | + 3 | + + 3 3 | 850 |

FIG. 8

IMAGE PROCESSING SYSTEM AND AN IMAGE PROCESSING METHOD

CROSS-REFERENCE TO RELATED APPLICATION

The present patent application claims the benefit under 35 U.S.C. § 119(a)-(d) of United Kingdom Patent Application No. GB1805039.3, filed on Mar. 28, 2018 and entitled "AN IMAGE PROCESSING SYSTEM AND AN IMAGE PROCESSING METHOD." The content of GB1805039.3 is incorporated herein by reference in its entirety.

TECHNICAL FIELD

The present invention relates to an image processing system and an image processing method, and in particular relates to the localising of recognised characters in an image.

BACKGROUND

Character recognition is performed to convert text included in an image into machine-encoded text. Images that can be analysed using character recognition software include a scanned document, a photograph of a document, a photograph of a scene, a video recording, and text that has been superimposed on a document. The text in the image that can be converted includes typewritten, handwritten, and printed text.

The machine-encoded text includes any character encoding standard for electronic communication, such as ASCII and Unicode. Alternatively, the machine-encoded text includes a plurality of reference glyphs that have been obtained using the encoded standard. Furthermore, the machine-encoded text can include both the machine-encoded standard together with the plurality of reference glyphs.

Character recognition software is configured to receive an image as input, and output machine-encoded text. The term character recognition refers to the identification and recognition of individual characters in the image. However, the term character recognition also is used to include word recognition, where the identification and recognition occurs one word at a time. Character recognition is exemplified by optical character recognition, optical word recognition, intelligent character recognition, and intelligent word recognition.

Character recognition is customised based on the writing system that is included in the document, such as Latin, Cyrillic, Arabic, Hebrew, Indic, Bengali, Devanagari, Tamil, Chinese, Japanese, Korean, Emoji, Morse code, and Braille characters. Character recognition is further customised based on the language of the text included in the image. The writing system and language of the text can be identified by the user, or alternatively, the writing system and language of the text can be identified by the character recognition software from the context of characters and words that are recognised. Furthermore, the character recognition can be customised to handle documents which include text in a number of writing systems or languages.

Character recognition occurs by associating machine-encoded characters with at least one example of a reference glyph that could be detected in an image. The accuracy of the character recognition is improved by increasing the number of reference glyphs that represent a machine-encoded character. This is particularly useful for enhancing accuracy at recognising a variety of fonts or handwriting styles.

A number of conventional techniques are available for comparing a character identified in the image with the reference glyphs, such as matrix matching and feature extraction. Matrix matching involves the pattern of the pixels of the identified character being compared with the pattern of the pixels of the reference glyphs. Feature extraction decomposes the input character into features such as lines, closed loops, line direction and line intersections, and these extracted features are then compared with corresponding features of the reference glyphs.

A further technique that is available is intelligent recognition, which is achieved by using machine learning to train a computer system that makes use of a neural network. Intelligent recognition enhances the recognition of characters that do not correspond to the reference glyphs. Strings of characters, such as words being used in phrases, provide the neural network with context information, so that the character recognition is customised to recognise words that are difficult to recognise in isolation. Furthermore, the neural network can be trained so that low quality images can be accurately recognised. The training of the neural network is achieved by inputting representations of the characters that are to be recognised. The training phase performs a gradient descent technique so that the neural network is optimised by reducing output errors. The output of machine-encoded text is based on a probability measure from a comparison with the samples of text that are input during the training phase. Feed forward processing of the neural network is performed so that there is convergence towards the probability measure. The neural network is used to customise the character recognition so that it can perform character recognition of characters that have not been encountered during the training of the neural network.

The position of the machine-encoded characters is typically identified because the identified character is formed of known connected components. However, individual characters are not identified when performing intelligent character recognition with a neural network, because instead a character or word is identified as a whole. Furthermore, the recognition of individual characters is not a reliable measure if the image is low quality, such as including perspective issues resulting in the size and orientation of the text being inconsistent. Accordingly, the use of neural networks increases the accuracy of the character recognition, although reduces the accuracy of the estimate of the position of the characters in the image.

Consequently, there is a demand for improving the estimate of position of characters that have been recognised in an image. It would be useful to enhance the position estimate of the characters independently of the character recognition technique that has been used, although this is particularly valuable for situations in which the character recognition technique makes use of a neural network.

SUMMARY

According to a first aspect there is provided an image processing system for localising recognised characters in an image, including an estimation unit to estimate a first location of a recognised character that has been obtained by performing character recognition of the image; a determination unit to determine second locations of a plurality of connected components in the image; a comparison unit to compare the first location and the second locations, to identify a connected component associated with the recognised character; and an association unit to associate the recognised character, the identified connected component, and the second location of the identified connected component.

BRIEF DESCRIPTION OF THE DRAWINGS

Embodiments will now be described, by way of example only, with reference to the accompanying drawings, in which:

FIG. 4 provides an example that illustrates an image for which the position is identified for a plurality of characters in the image;

FIGS. 5A-C provides an example that illustrates character recognition being performed to recognise characters in the image;

FIG. 8 provides a table that includes examples that show how connected components are associated with recognised characters.

DETAILED DESCRIPTION

Various embodiments, features, and aspects of the invention will be described in detail below with reference to the drawings. Each of the embodiments of the present invention described below can be implemented solely or as a combination of a plurality of the embodiments or features thereof where necessary or where the combination of elements or features from individual embodiments in a single embodiment is beneficial.

Figure 1:
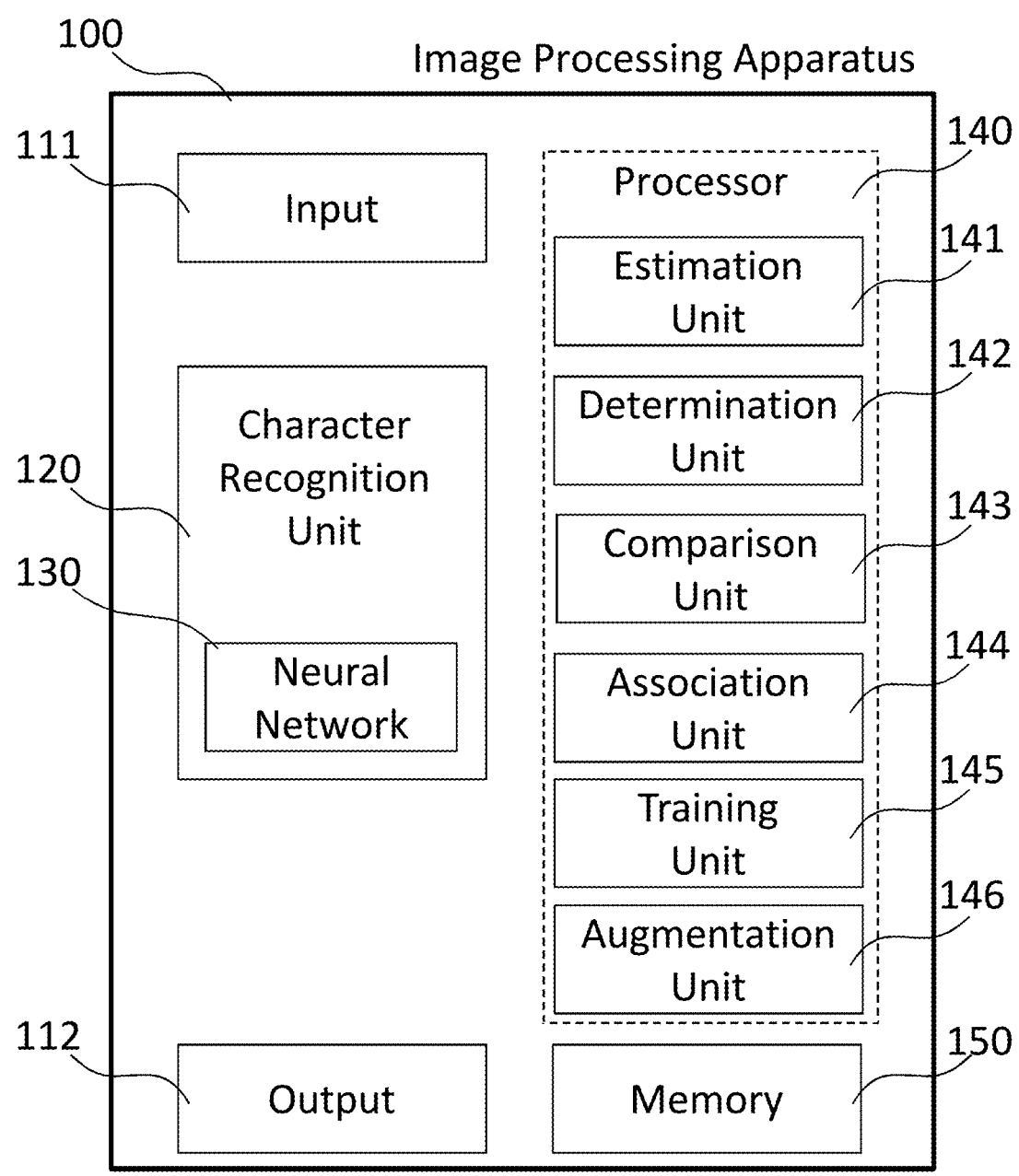
FIG. 1 provides a schematic diagram that illustrates an image processing system for identifying a position of at least one character in an image.

FIG. 1 is a schematic diagram that illustrates an image processing system 100 for identifying a position (location) of at least one character in an image. The image processing system 100 is typically used to identify position for a plurality of characters that are arranged in one or more lines of text. The identification of position for the plurality of characters can also be referred to as localising the recognised characters in the image.

The image processing system 100 includes an input 111 and an output 112, a character recognition unit 120, a processor 140 and a memory 150. The processor 140 comprises an estimation unit 141, a determination unit 142, a comparison unit 143, an association unit 144, a training unit 145, and an augmentation unit 146.

The character recognition unit 120 makes use of conventional techniques that are available to recognise text in an image. The character recognition unit 120 performs recognition by making use of a neural network 130 that has been trained to recognise a plurality of strings of characters, such as words being used in context.

Character recognition of an image will typically result in the recognition of a plurality of characters that make up text contained in the image. However, character recognition software can also function to recognise a single character that is contained in the image. Therefore, this disclosure explains the specific case in which the position of a single character is identified. Furthermore, disclosure is provided that this technique can be generalised to provide the identification of position for a plurality of characters that are contained in the image. As a consequence, the one or more recognised character are localised in the image, with the result that the accuracy of the location (position) of the recognised characters is improved.

The processor 140 executes software to serve as an estimation unit 141, a determination unit 142, a comparison unit 143, and an association unit 144. The estimation unit 141 is configured to estimate a first location of a recognised character that has been obtained by performing character recognition of the image. The determination unit 142 is configured to determine second locations of a plurality of connected components in the image. The comparison unit 143 is configured to compare the first location and the second locations, to identify a connected component associated with the recognised character. The association unit 144 is configured to associate the recognised character, the identified connected component, and the second location of the identified connected component.

As a result, the position of the connected component of the character is associated with the position of the machine-encoded character. Consequently, the recognised character is localised in the image, with the position of the character being enhanced by being based on the character in the image, instead of using an estimate resulting from the region of the image that was used to perform character recognition.

The processor 140 executes software to further serve as a training unit 145, which trains the neural network using the second location that is associated with the recognised character. It is possible for the user to make corrections to the character recognition. The position of the recognised character provides context to the character identified image, and consequently the position information is useful for teaching the neural network. As a consequence, the neural network can learn from corrections made by the user. The precise position of the recognised character is not compulsory for the user to modify the output text and therefore feed the learning. That being said, having a precise knowledge of the position of the recognised characters is helpful as it enables more precise graphical interfaces and improves user experience with the software.

The processor 140 executes software to further serve as an augmentation unit 146 which augments the image to include the recognised character at the second location. The recognised character is a machine-encoded representation of the connected component. For example, the recognised character could be a machine-encoded representation of a character provided by an encoding standard for electronic communication, such as ASCII and Unicode. Alternatively, the recognised character could be a reference glyph that has been obtained using the encoded standard. Furthermore, recognised character could include both the machine-encoded representation and the reference glyph.

The provision of a character recognition unit 120 is not an essential feature of the image processing system 100 because instead the image processing system 100 could be used to determine the position of text for which character recognition has already been performed. For the example illustrated by FIG. 1, the image processing system 100 provides at least one character recognition unit 120.

The character recognition unit 120 can comprise a plurality of character recognition units 120 including a first character recognition unit and a second character recognition unit, and may include further character recognition units. Each character recognition unit 120 performs the function of identifying characters in a region of an image, and associating the identified characters with machine-encoded text. The characters of the image are identified and recognised based on analysis of the pixels in the region the image. Characters can be recognised in a selection of languages, in a variety of fonts.

Making use of a plurality of different character recognition units 120 allows the character recognition units 120 to be customised so that character recognition is optimised for specific conditions. Examples of specific conditions include the quality of the image, the language of the text, the font of the text, whether the text is typewritten or handwritten, and the computing resources that are available.

The input 111 and output 112 are configured to receive and transmit electronic data. The input 111 is configured to receive the image that is to be analysed, for example, from a local area network, the internet, or an external memory. Furthermore, the input 111 is configured to receive instructions from a user via, for example, a mouse, a touch screen, or a keyboard. The output 112 is configured to output the text that has been identified. The output 112 includes a display for identifying the text to the user. The output 112 includes a network connection for communicating over the internet.

The image processing system 100 is exemplified by a single image processing apparatus 100 that includes a single character recognition unit 120. As an alternative, the image processing system 100 could comprise a plurality of character recognition units 120. Furthermore, features of the image processing system 120 could be distributed across several different devices, such as a plurality of image processing apparatus, each having a character recognition unit.

The features of the image processing apparatus 100 can be arranged differently. For example, each of the character recognition units 120 can include a processor 130 that is configured to serve as a determination unit 142, an association unit 143, an identification unit 144, an augmentation unit 145, and a training unit 146.

The plurality of character recognition units 120 may be part of the same apparatus, or alternatively distributed as a system across a plurality of devices.

The image processing apparatus 100 can be a part of a personal computer. Alternatively, the image processing apparatus 100 can be part of a multifunction peripheral device, further including a scanner, a copier, a facsimile, and a printer.

Figure 2:
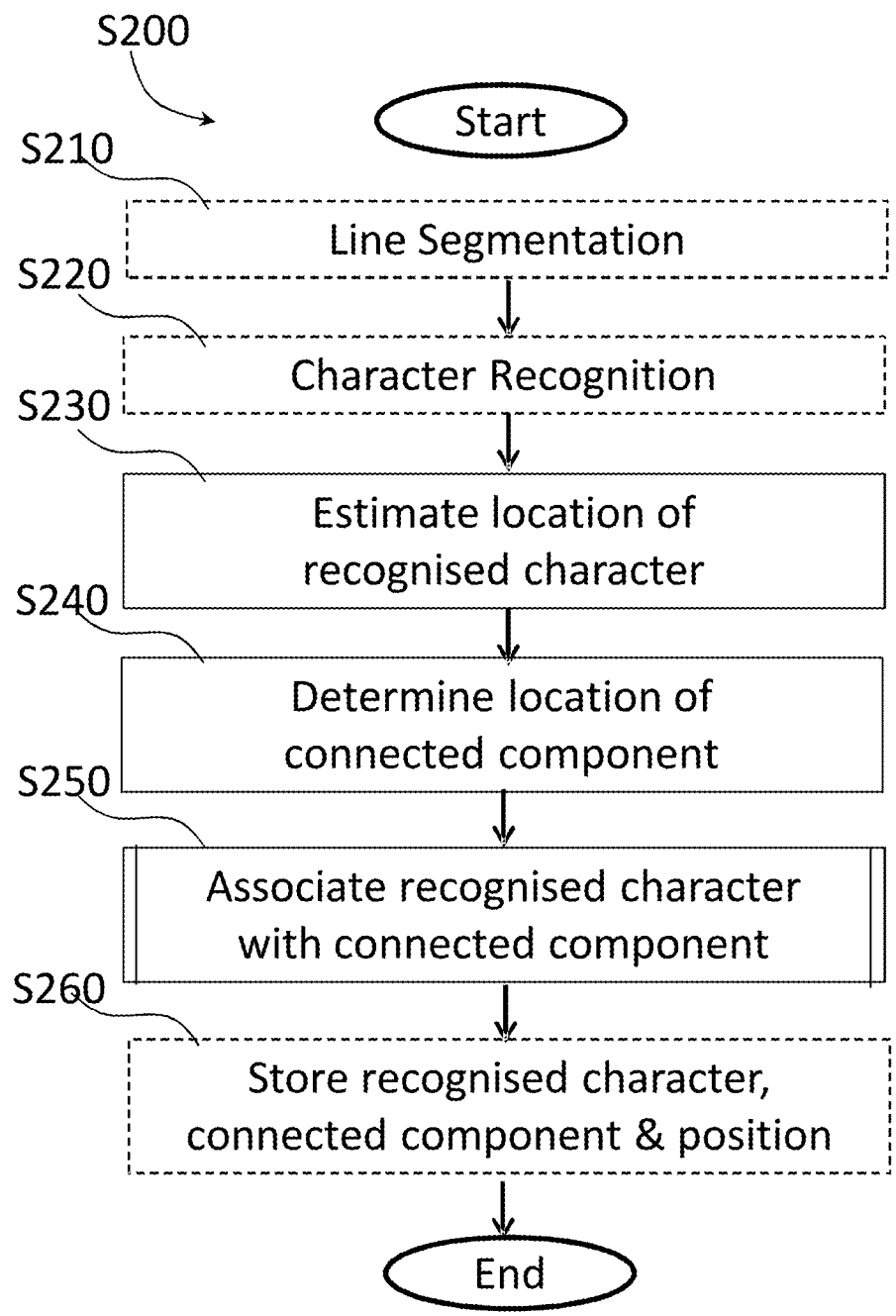
FIG. 2 provides a flowchart illustrating an image processing method for identifying a position of at least one character in an image.

FIG. 2 is a flowchart illustrating an image processing method S200 for identifying a position of a character in an image 300. A typical image 300 for which character recognition is to be performed is a document that comprises lines of text. The image processing method S200 is implemented by the image processing system 100. A program, that when implemented by the image processing system 100, causes the image processing system to perform the image processing method S200. A non-transitory computer-readable medium stores the program.

In step S210, line segmentation is performed on the image. As a result of the line segmentation S210, a plurality of lines of text are identified in the image.

A variety of techniques are available to perform image segmentation S210, which is the process of partitioning a digital image into multiple segments. A number of techniques are available for performing line segmentation S210. The image is binarized to turn grey-scale or color-scale into a binary image. A line segment is identified if it has the expected characteristics of a line of text, such as detecting edges of shapes that are consistent with a line, or determining that individual characters or individual words are clustered together.

The line segmentation step S210 can perform line recognition for lines of text that are arranged in a number of orientations. The orientation that the text is arranged depends on whether the document is presented in portrait or in landscape. In addition, text may be arranged at an angle, particularly if the document contains handwriting. Lines of text are usually arranged horizontally, with the text reading from left to right. However, in some languages, text is read from right to left. Furthermore, in some languages the lines are arranged vertically instead of horizontally.

The line segmentation can be performed by the character recognition unit 120 as part of the character recognition step S220. Alternatively, the line segmentation can be performed by the processor 140.

Note that step S210 is not essential, because the line segmentation could be performed in advance of the image processing method S200, with character recognition being performed for an image 310-330 that has already been segmented into a line of text. The line segmentation S210 does not need to be performed by the image processing apparatus 100, because instead the line segmentation could be performed by a different device.

The character recognition unit 120 performs further segmentation of the image. Accordingly, each line of text is segmented into a plurality of regions.

In step S220, character recognition is performed on each of the regions.

Each of the regions contains an individual character or an individual word. Each regions of the image can be identified by one or more coordinates of this region, such as the center of the region or a corner of the region.

The character recognition unit 120 comprises a neural network 130, and functions by determining activations that represent a probability value that the output of the character recognition has converged. The activations provide machine-encoded character values that have been recognised above a threshold confidence value. An activation is an output of the neural network, and for example, could specify that there is a probability of 95% that the letter "a" has been recognised.

The identification of the position of the machine-encoded characters is particularly valuable for the situation in which the character recognition unit 120 comprises a neural network 130, because intelligent character recognition does not generate an accurate position of the characters in the image 300.

Accordingly, the identification of the positions of the characters is performed after the character recognition has been completed.

Note that step S220 is not essential, because the character recognition could be performed in advance of the image processing method S200, with the position being determined for machine-encoded characters that have already been recognised from characters identified in the image 300. The character recognition S220 does not need to be performed by the image processing apparatus 100, because instead the character recognition could be performed by a different device.

In step S230, an estimate is made of the position of each recognised character in the image. The estimate provides a coordinate corresponding to the region of the image that was used to perform character recognition by the character recognition unit 120. Thus, the region that is used to perform character recognition serves to provide an approximation of position of the character.

The image is a two-dimensional array of pixels, for which position is addressed by a coordinate system. The horizontal position is addressed by an x-coordinate. The vertical position is addressed by a y-coordinate.

The estimated position can be specified by both the x-coordinate and y-coordinate. However, for a particular line of text, it is not necessary to specify the vertical position, and instead, it is possible to estimate the position using only the horizontal position. Accordingly, a single x-coordinate could be used to estimate the position of the recognised character within a line segment.

In step S240, a coordinate is determined for each connected component in the region of the image identified in step S230.

A connected component is a part of the image for which adjacent pixels of the image have the same color, such as groups of touching pixels that are black. Connected components can be identified in the image because the image is binarized so that the text appears as black characters on a white background. A conventional technique is used to binarize the image, such as determining whether a feature has been detected having a grey-scale value or a color-scale value that is above a threshold.

A connected component usually corresponds to a single character such as the letter "T", for which all of the pixels of the character are connected together. Some characters are formed of a plurality of connected components, such as the letter "i", which comprises two connected components. It is also possible for a plurality of characters to form a single component, such as characters that are joined together by a ligature or an underline. The correspondence between characters and connected components is dependent on the writing system and language, as well as the particular font that is used in the image.

Accordingly, each connected component is associated with a coordinate. The coordinate can correspond with a part of the connected component itself, such as the left-most point of the connected component, the right-most point of the connected component, or a midpoint of the left-most point and the right-most point. Alternatively, the coordinate can correspond with part of a bounding box that contains the connected component, such as the center of the bounding box, or a barycenter.

It is possible to specify both an x-coordinate and a y-coordinate representing the horizontal position and vertical position in the image of the connected component. However, for a particular line of text, it is not necessary to specify the vertical position, and instead, it is possible to determine the position of the connected component using only the horizontal position. Accordingly, a single x-coordinate could be used to determine the position of the connected component. The use of a single coordinate simplifies the calculation by comparing positions along a single dimension.

In step S250, the recognised characters obtained in step S220 are associated with the detected connected components determined in step S240. As a consequence, the estimate of the position of the recognised character is replaced by the position of the connected component. Accordingly, the recognised characters are assigned a position based on the text identified in the image.

As a result of step S250, each recognised character is associated with a connected component, based on a comparison of their coordinates. The recognised character is associated with the closest connected component, because the closest connected component is most likely to correspond to the recognised character.

The distance between a recognised character and a connected component is defined as the difference between the coordinates associated with the recognised character and the connected component. The closest coordinates correspond to the minimum distance between the recognised character and the connected component. For a particular line of text, it is possible to calculate the distance using only the x-coordinate, which simplifies the calculation, because the positions are compared using a single dimension.

If the distance between the recognised character and the connected component is below a threshold, this indicates that it is likely that the recognised character has been associated with the correct connected component. However, it is possible that it may be difficult to associate the recognised characters and the connected components. If there are several possibilities, a recognised character is associated with the connected component that is on the left of it. If there are any unassigned connected components, then these are associated with their closest recognised character.

Figure 3A:
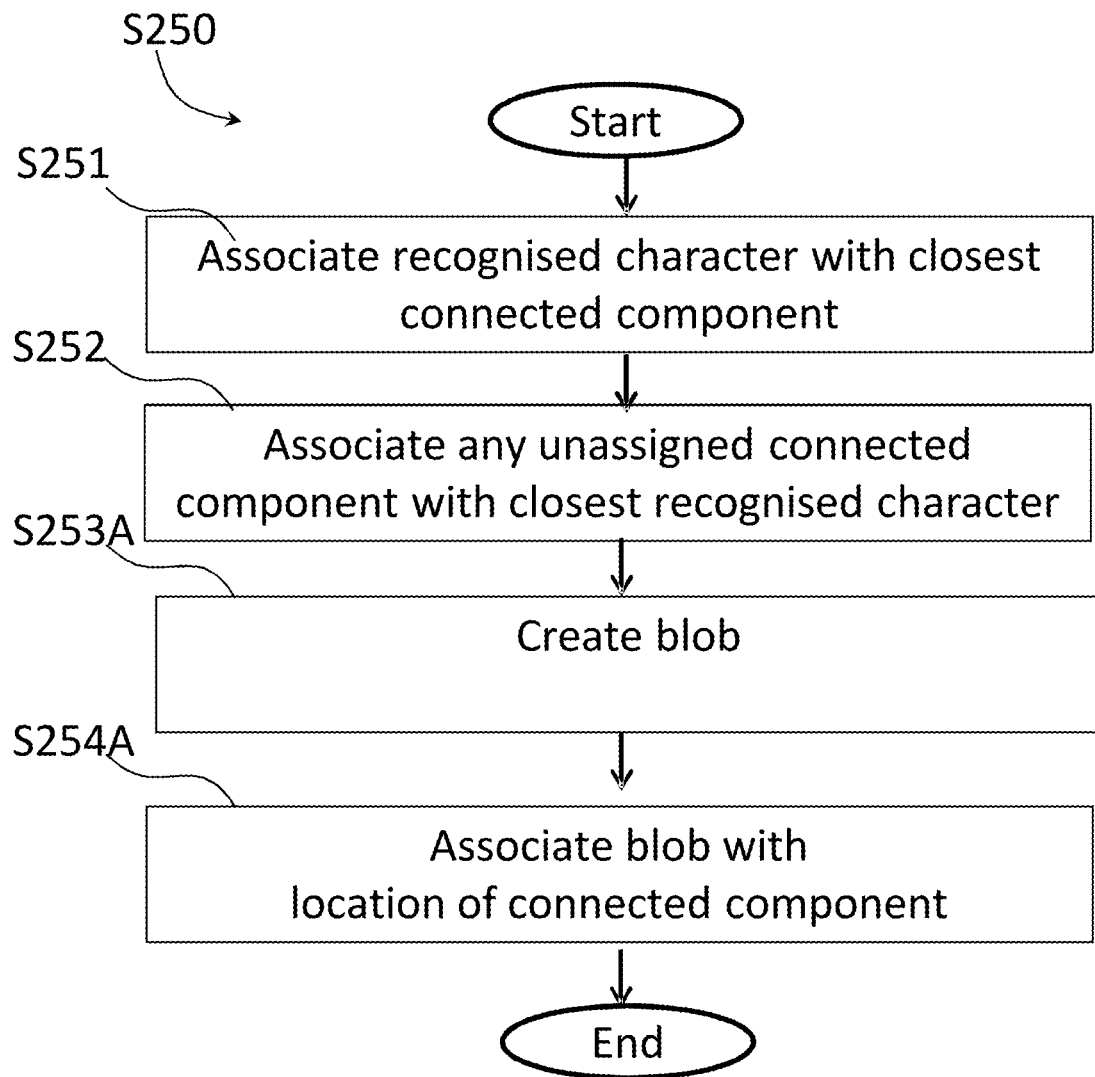
FIGS. 3A-C provide flowcharts illustrating how an association is made between recognised characters and connected components.
Figure 3B:
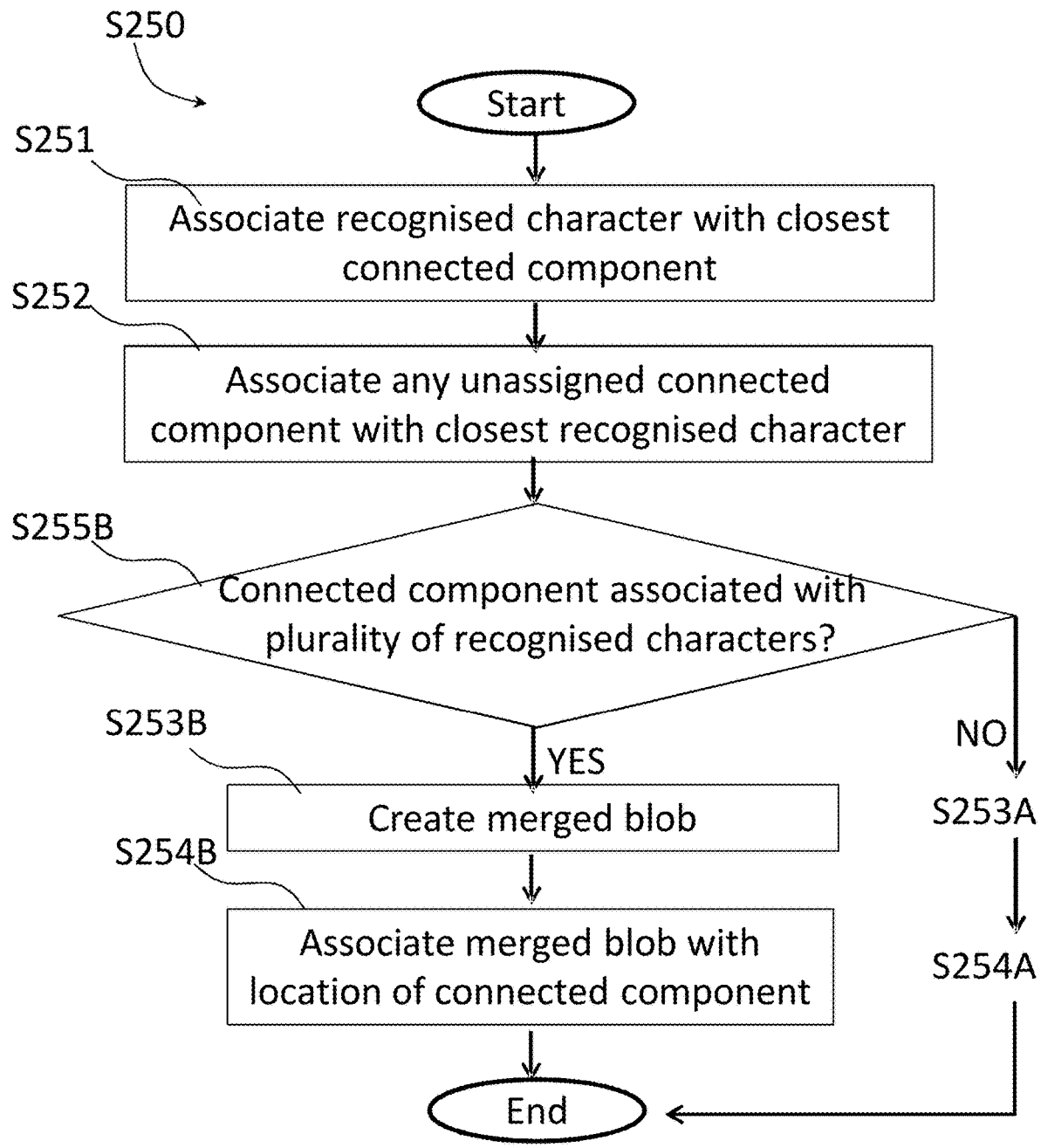
Figure 3C:
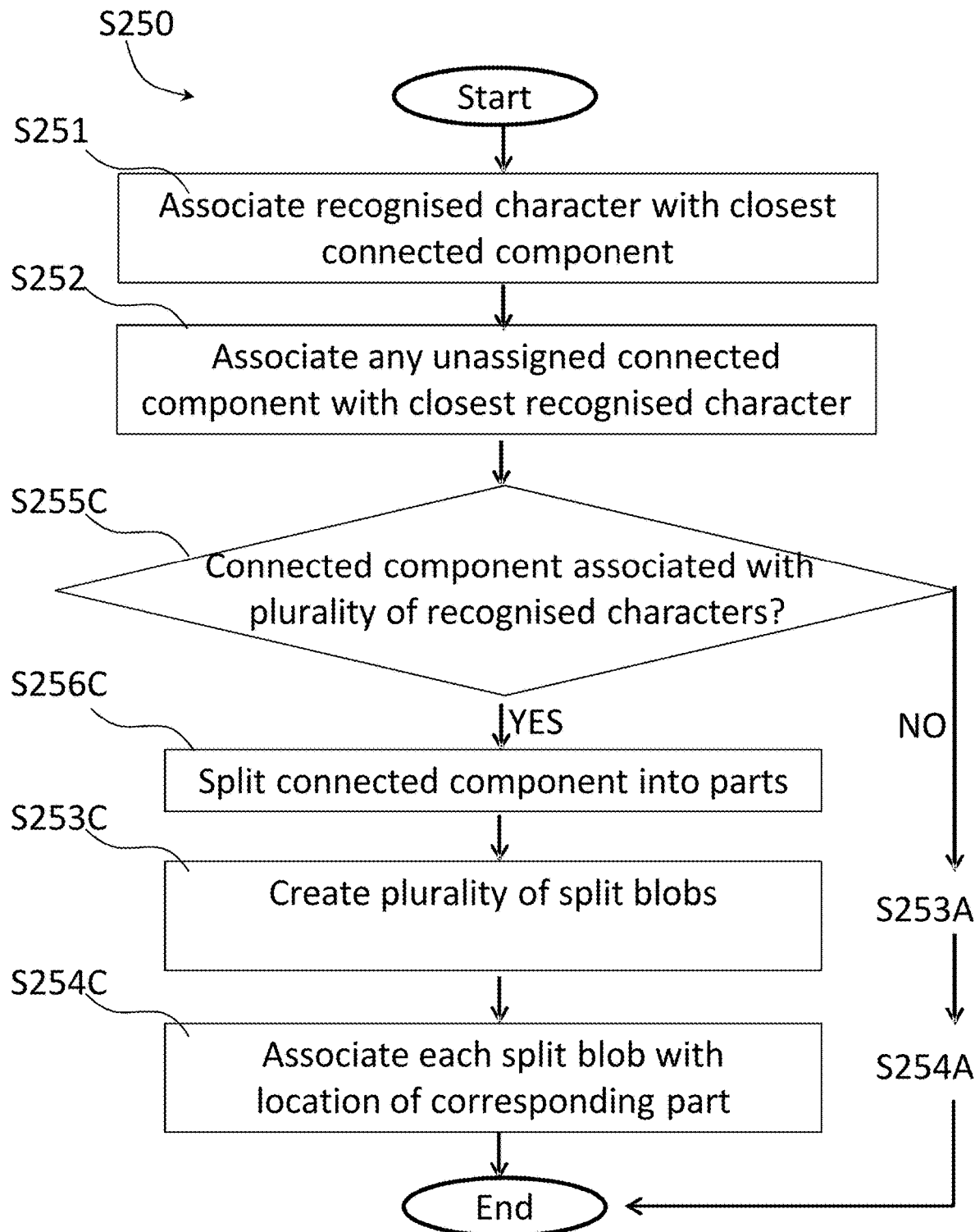

Further details of step S250 are provided by the disclosure of FIGS. 3A-C.

FIG. 3A provides a first flowchart illustrating how an association is made between recognised characters and connected components S250.

In step S251, the comparison unit 143 identifies the connected component having a second location that is closest to the first location of the recognised character. Thus, the recognised character is associated with its closest connected component.

In step S252, the comparison unit identifies any other connected component that is not associated with any recognised character, and identifies the closest recognised character to the another connected component. As a result, if there is one or more unassigned connected component, then in step S254A it will be associated with its closest recognised character.

In step S253A, a blob is created for each recognised character. Each blob comprises the recognised character, together with the connected component. For the situation in which there was one or more unassigned connected component in step S252, each blob comprises the recognised character, together with the one or more other connected component.

In step S254A, the association unit 144 associates the recognised character, the identified connected component, and the second location of the identified connected component. For the situation in which in step S252 associates an unassigned connected component with its closest recognised character, the association unit 144 associates the closest recognised character, the identified connected component of the closest recognised character, the another connected component, and the second location of the identified connected component. The number of connected components that may be associated with a recognised character is not limited to two.

FIG. 3B provides a second flowchart illustrating how an association is made between recognised characters and connected components S250. FIG. 3B provides a technique for handling the situation in which a connected component corresponds to a plurality of recognised characters, with this situation occurring if the text in the image includes underline or a ligature.

Steps S251-S252 in FIG. 3B are the same as for FIG. 3A. Step S252 provides for the possibility that unassigned connected components are associated with the closest recognised character even for the situation in which the connected component corresponds to a plurality of recognised characters.

In step S255B, an assessment is made of whether the connected component of step S251 is associated with a plurality of recognised characters.

If the connected component is associated with a plurality of recognised characters (YES in step S255B), then the method progresses to perform steps S253B and S254B.

If the connected component is not associated with a plurality of recognised characters (NO in step S255B), then this corresponds to the situation of FIG. 3A, and so steps S253A and S254A are performed.

In step S253B, a merged blob is created for each recognised character. Each merged blob comprises the plurality of recognised characters, together with the connected component. For the situation in which there was one or more unassigned connected component in step S252, each blob comprises the plurality of recognised characters, together with the one or more other connected component.

In step S254B, the association unit 144 associates the plurality of recognised characters, the identified connected component, and the second location of the identified connected component. For the situation in which in step S252 associates an unassigned connected component with its closest plurality of recognised characters, the association unit 144 associates the closest plurality of recognised characters, the identified connected component of the closest plurality of recognised characters, the another connected component, and the second location of the identified connected component.

FIG. 3C provides a third flowchart illustrating a further embodiment in which an association is made between recognised characters and connected components S250. FIG. 3C provides an alternative method to FIG. 3B for handling the situation in which a connected component corresponds to a plurality of recognised characters.

Steps S251-S252 in FIG. 3C are the same as for FIG. 3A.

Step S255C in FIG. 3C is the same as step S255B in FIG. 3B. Accordingly, an assessment is made of whether the connected component of step S251 is associated with a plurality of recognised characters.

If the connected component is associated with a plurality of recognised characters (YES in step S255C), then the method progresses to perform steps S256C, S253C and S254C.

If the connected component is not associated with a plurality of recognised characters (NO in step S255C), then this corresponds to the situation of FIG. 3A, and so steps S253A and S254A are performed.

In step S256C, a splitting unit splits the connected component into a plurality of parts. The number of parts corresponds to the number of recognised characters. The connected component is split so that each part corresponds to one of the plurality of recognised characters. The splitting may be done based on the locations of the recognised characters so that the connected component is split into plural connected components having the same number as the recognised characters. The comparison unit is configured to identify a location for each of the parts.

In step S253C, a plurality of split blobs are created. A split blob is created for each recognised character. Each split blob comprises a recognised character, together with the corresponding part of the connected component. For the situation in which there was one or more unassigned connected component in step S252, it is possible for a split blob to comprise a recognised character, the corresponding part of the connected component, together with the one or more other connected component.

In step S254C, the association unit 144, for each of the parts, associates the recognised character, the part of the connected component, and the location of the part. For the situation in which in step S252 associates an unassigned connected component with its closest recognised character, it is possible for the association unit 144 to associate the closest character, the identified part of the connected component of the closest recognised character, the another connected component, and the location of the part of the identified connected component.

Returning to FIG. 2, after step S250 is performed, as illustrated by FIGS. 3A-C, the image processing method S200 progresses to step S260.

In step S260, the memory 150 stores in association with the image 300, the recognised character and the second location of the identified connected component.

Note that step S260 is not essential, because instead the processor 140 can display to the user the output of the image processing method S200. Storage in a memory 150 could occur after the image processing method S200 has completed. The storage does not need to be performed by a memory of the image processing apparatus 100, because instead the output of the image processing method S200 can be stored by a different device.

If it is determined in the image processing method S200 that an error has occurred in the identification of position of a character, this indicates that the character has been incorrectly associated with a connected component. This indicates that there is an error in the mapping between the image and the machine-encoded character. In this situation, the image processing method S200 returns to the associating step S250, so that the character can be associated with a different connected component.

To achieve this, the image processing system 100 shown in FIG. 1 can be further enhanced by providing an error detection unit. The error detection unit is configured to detect that the recognised character and the connected component do not correspond. This feature is used for determining that the determination of the position of the recognised character from step S260 is incorrect. As a result, the error detection unit causes the image processing unit to return to step S250. The detection of errors can be performed by the error detection unit comparing the input image with the output machine-encoded text, to determine whether the location of characters identified in the image correspond to the location of the corresponding recognised characters. As an alternative, the detection of errors can be performed by the user.

The disclosure of the image processing method S200 specifies the situation in which each character is associated with a single position. However, as an alternative, each character that is identified in the image can be associated with a plurality of positions. This is useful for allowing the position of the character to be specified in further detail. For step S230, the position of each recognised character is associated with a plurality of coordinates, with each coordinate corresponds to a different part of the recognised character. For step S240, the position of the connected component is associated with a plurality of coordinates, wherein each coordinate corresponds to a different part of the connected component. For step S250, the parts of the recognised character are associated with the parts of the connected component. For step S260, the position of the parts of the recognised character is determined using the coordinates of the parts of the connected component. Accordingly, the accuracy of the shape and orientation of the connected component is enhanced.

The image processing method S200 can be performed by a number of different devices or a number of different users carrying out the individual steps S210-S260. In particular, the line segmentation and character recognition steps S210-S220 could be performed separately from the other steps of the image processing method S200. Accordingly, it would be possible to retrofit an existing character recognition unit 120 so that it can serve as part of the disclosed image processing system 100.

Associating the recognised character with the connected component S250 allows the position of the determination to be determined S260, even for the situation in which the quality of the image is low. Examples of low quality images include:

images for which the recognised characters are different in height, which can occur for the situation in which a document has been scanned at an angle, such as by a camera taking a photograph of the document;

images for which the line of text is not uniform, which can occur for a situation in which a document is not placed flat at the time of being scanned; and images for which the characters cannot be accurately recognised in the image, which may occur if the document contains text that is not uniform.

To achieve this, the image processing system 100 shown in FIG. 1 can be further enhanced by providing a perspective detection unit. The perspective determination unit is configured to determine whether or not the perspective of the image affects the position of the character. Accordingly, the image processing system 100 can identify the position of a plurality of characters that are differing in height or width. This can be done by measuring the height or width of the characters on a line of text, to determine whether there is any change in these measures when moving across the line of text.

As a consequence of the character recognition, a mapping is provided between characters in the image and machine-encoded characters output by character recognition being performed on the image. It is useful for the mapping to specify the position in the image of the characters. Associating the machine-encoded characters with the position of the characters in the image results in the machine-encoded characters being arranged to correspond to the original image. This is useful for displaying to a user the machine-encoded characters so that they correspond to the text included in the image. Furthermore, overlaying the image with the machine-encoded characters, allows the text to be selected by the user. Providing machine-encoded text is useful for providing a search function by allowing search of the machine-encoded text. The overlaying of text with the recognised characters is useful for displaying the text to the user, for example, the situation in which the recognised characters are translated into a different language, such that the translated text can be displayed together with the original image for the purpose of serving as a comparison.

FIGS. 4-7 illustrate an example of the image processing method S200 being performed for an image 300, to identify the position of a plurality of characters in the image 300.

Figure 4:
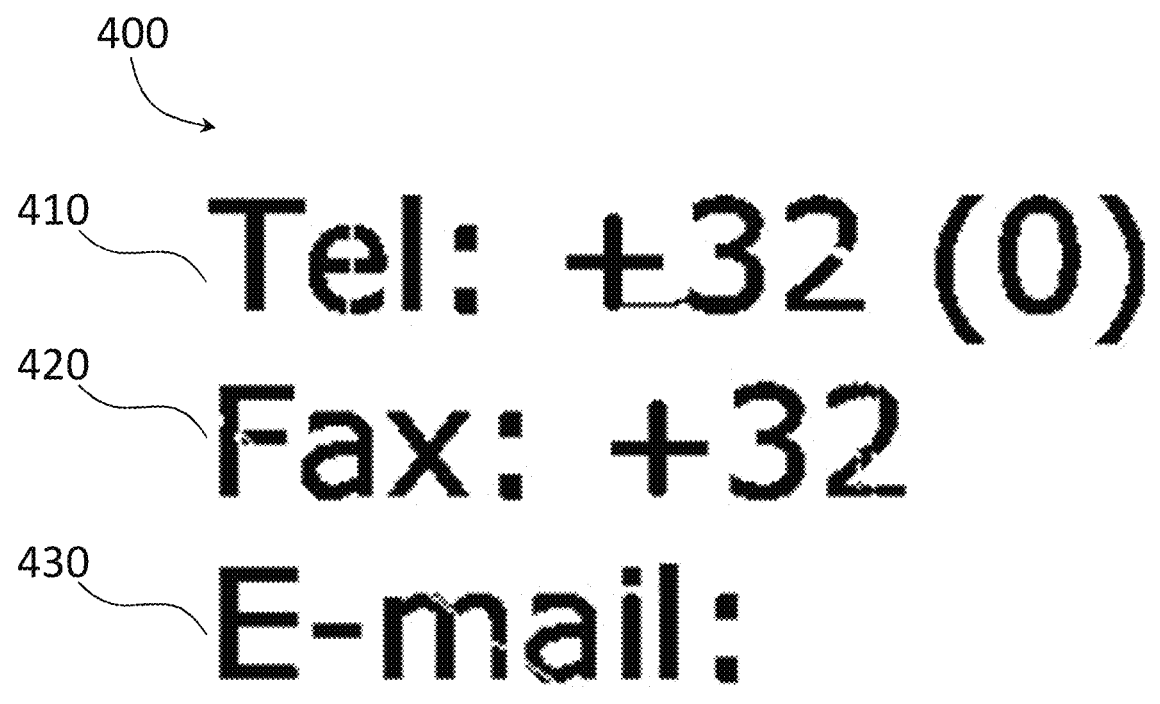

FIG. 4 shows an image 300 that is to be subject to character recognition. The image includes three lines of text 410-430, showing a typical example of how characters are arranged horizontally and vertically in an image 300. The quality of the image 300 is low, which can be seen from:

Characters not being completely scanned, such as the character "2" on the top line of text 410 being in two separate pieces.

Characters being connected as can be seen for the text "+3" on the top line of text 410 being joined together by an erroneous connecting line.

The scan includes a grey background, which could make it difficult to distinguish the connected components of the text in the image. The image 300 shows a grey background surrounding the text, due to the low quality of the scan. Note that performing the binarizing of the image is expected to eliminate the grey background. Accordingly, it is possible to distinguish the text from the background.

FIGS. 5A-C illustrate how machine-readable characters are extracted from the original image. Lines 410-430 of FIGS. 5A-C correspond to lines of text that are identified in the image 300 shown in FIG. 4. Below each line of text is illustrated output 510-530 from the character recognition unit 120.

The output 510-530 from the character recognition includes a plurality of machine-encoded characters, each provided together with an activation value. The activation value is illustrated in FIGS. 5A-C by an activation strip which indicates how the activation value is used to determine the machine-encoded character.

An activation value indicates the probability that a character has been identified. The value of the activation corresponds to the likelihood that the identification of the machine-readable character is accurate.

The activation strip provides a visual display of the activation value corresponding to the machine-readable character. Each of the machine-readable characters corresponds to the character identified as being in the image, although the position of the machine-readable character has not been determined.

For each line of text, the character recognition unit 120 scans the image from left to right. Each line is considered one column at a time, thus scanning across the line. Each column comprises a vertical group of pixels that form part of the line. As each column is scanned, information obtained is used to determine the activation value associated with the characters that are identified.

In FIGS. 5A-C, the activation strips are shown to have two colors, being depicted as black in color towards the left of the activation strip, and grey in color towards the right of the activation strip. When the activation strip is black, this represents the activation value of the given character being higher than the activation value for any other character. When the activation strip is grey, this represents the activation value being better than other activations values of other characters but not bigger than the null activation value. As a consequence, the activation strips shown in FIGS. 5A-C demonstrate that as each character identified in the image is read on the line from left to right, the activation value increases, to ensure that the level of confidence of the machine-encoded character is above the required threshold.

Taking for example the letter "T" in line 410 of FIG. 5A, the output 510 includes the machine-encoded character "T"

together with an associated activation strip. When this activation strip is black, this indicates that the letter "T" has been recognised with an activation value indicating that is higher than the activation than for any other character. When the activation strip becomes grey, this indicates that enough columns have been read to determine that the letter "T" has been identified with a probability that exceeds a required threshold.

The output of the machine-encoded character "T" allows the position of this character to be estimated, in step S230. This is achieved by determining that the letter "T" should be positioned in the region of the image that has been used to recognise the character "T".

Figure 6A:
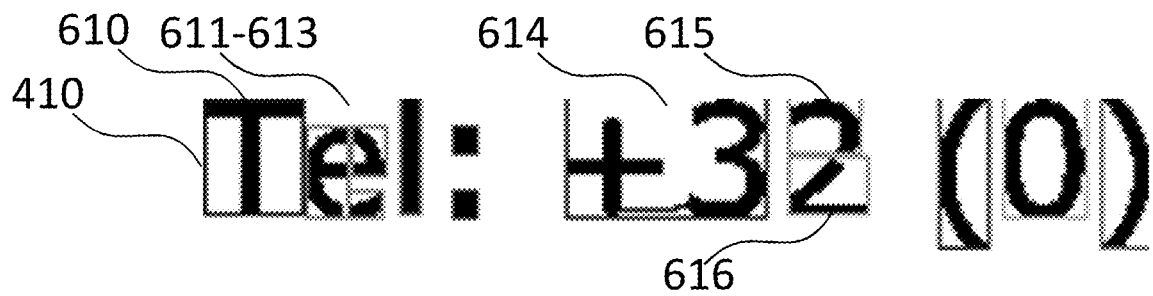
FIGS. 6A-C provides an example that illustrates a plurality of connected components being identified in the image.
Figure 6B:
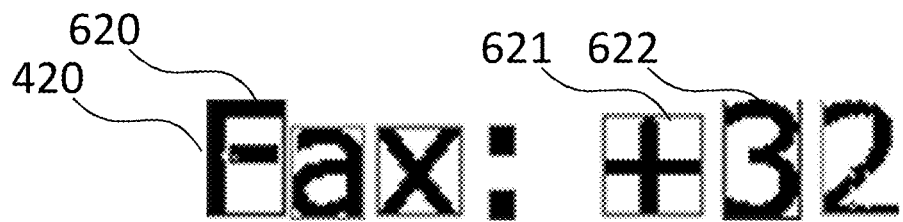
Figure 6C:
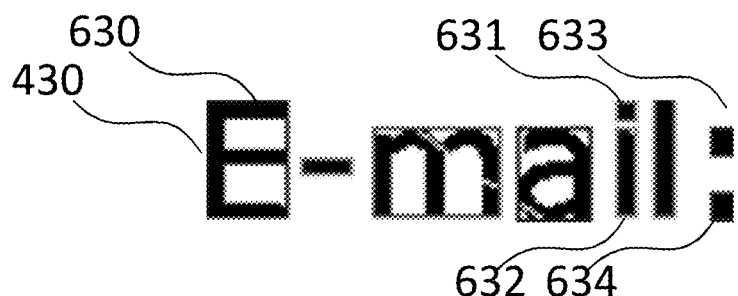

FIGS. 6A-C show each of the lines being segmented. A variety of techniques are available that segment a line of text into connected components. Connected component analysis is an algorithmic application of graph theory, where subsets of connected components are uniquely labelled. Algorithms can perform one connected component at a time, such that once the first pixel of a connected component is found, all of the connected pixels of that connected component are labelled as being part of that connected component, before going onto the next connected component in the image. Alternatively, a double pass technique can be performed, by first passing over the image to assign temporary labels, and secondly passing over the image to performing connectivity checks.

For each of the connected components that has been identified, a bounding box has been provided that surrounds the connected component. Thus, the image is partitioned into a plurality of regions that are defined by the bounding boxes. As an example, the character "T" in FIG. 6A is shown surrounded by a bounding box 610, which illustrates that a connected component has been identified. Similarly, FIG. 6B shows the character "F" being surrounded by a bounding box 620, and FIG. 6C shows the character "E" being surrounded by a bounding box 630.

FIGS. 6A-C illustrate that connected components do not always provide an exact match corresponding to machine-readable characters. As a consequence, connected components can be merged or split if this is appropriate.

It is possible that a plurality of different connected components correspond to a single character. There are many characters for which a plurality of connected components is to be expected. For example, FIGS. 6A-C show the character ":" being identified as having two different connected components 633-634. Similarly, FIG. 6C shows the character "i" being identified as having two different connected components 631-632. Other examples include characters that include accents or umlauts.

Furthermore, particularly for a low quality image, it is possible that an error results in a plurality of different connected components corresponding to a single character. This is seen in FIG. 6A by the character "2" being identified as having two different connected components 615-616, as shown by the two bounding boxes that separate this character into two separate regions. Similarly, FIG. 6A shows the character "e" being identified as having three different connected components 611-613.

On the other hand, it is possible that a single connected component could correspond to a plurality of characters. For example, FIG. 6A shows the text "+3" being part of the same connected component 614 because the scan shows these characters being connected by an erroneous line due to the low quality of the scan. In contrast, this error has not occurred in FIG. 6B, because these connected components 621-622 are not joined together.

Note that there exist situations for which a plurality characters are correctly identified as being connected to form a single connected component, such as dipthongs and ligatures. Another reason for characters to be connected to form a single connected component is due to characters being underlined, which depending on the font used, can cause characters below the line of text to be joined together.

The term "blob" can be used to refer to a recognised character being associated with one or more connected components. An assessment is made of whether a blob needs to be split, so that the connected component can be associated with a plurality of recognised characters.

The output of the blob can be used to determine a coordinate in step S240 that is to be used for the position of the corresponding machine-encoded character. The coordinate is placed in the vicinity of the connected component, for example, in the top left corner of the bounding box. Furthermore, a plurality of coordinates could be placed in the vicinity of the connected component, for example, around the perimeter of the bounding box.

Figure 7:
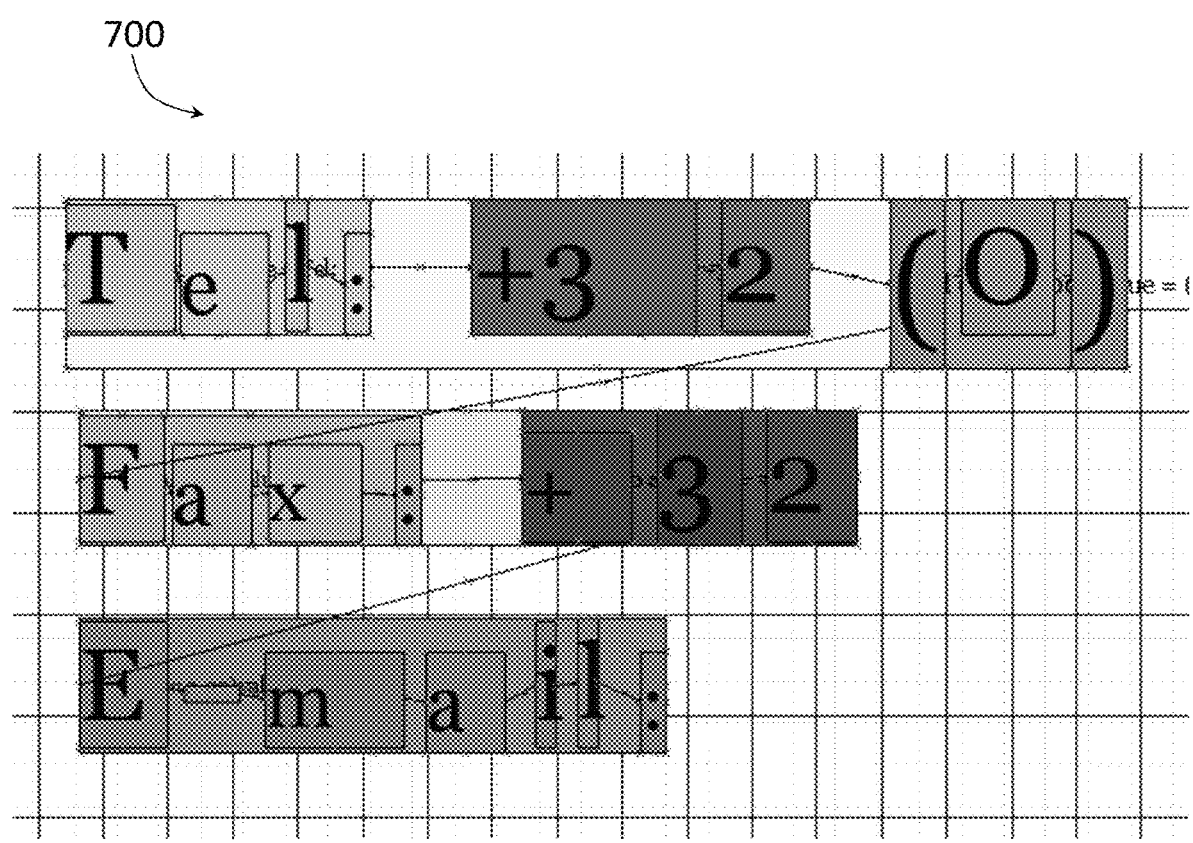
FIG. 7 provides an example that illustrates a plurality of characters that have been positioned based on the position of the plurality of connected components.

FIG. 7 illustrates the result 700 that is output after the character segmentation algorithm has been performed on the image. The machine-readable text is positioned based on the position of the connected components that were identified. The machine-readable characters are shown on a grid in positions that are based on the result of performing the image processing method S200 shown in FIG. 2.

The output 700 in FIG. 7 shows a number of crosses that represent coordinates that are used for placing the machine-encoded characters into the required position.

Taking for example the letter "T" in the top line of FIG. 7, this character is surrounded by a plurality of position markers, which are used for determining the position of this character in step S260. The machine-encoded letter "T" has been placed in position by making use of the coordinates that were associated with the connected component of the identified character "T" of the image. The bounding box of the letter "T" comprises a plurality of position markers around its perimeter. It would be possible to determine the position of the machine-encoded character by using a single coordinate that corresponds to the connected component, although using a plurality of coordinates improves the accuracy of the position of the letter "T", and ensures that is placed to have the correct orientation. The knowledge of position for each of the pixels of the connected components of the blob would provide the most accurate description of the position of the blob that is possible, although for convenience and to enhance the speed of execution of the software, this is simplified by using a bounding box or a barycenter.

Accordingly, the machine-readable characters shown in the image 300 illustrated by FIGS. 3-6 form three lines of text 410-430 that read:

Tel: +32 (0)

Fax: +32

E-mail:

The positioning contains some errors, so not all of the machine-readable characters are in the correct position.

FIG. 8 provides a table that includes examples that show how connected components are associated with recognised characters.

Row 810 of the table shows a single connected component and a single recognised character forming a blob. Connected component 610 is associated with the machine-encoded character "T", which together form the blob. This blob is created by step S253A, for the situation in which step S252 does not provide an association with any unassigned connected component.

Row 820 of the table shows a plurality of connected components and a single recognised character forming a blob. Connected components 633-634 are associated with the machine-encoded character ":", which together form the blob. This blob is created by step S253A, for the situation in which step S252 provides an association with the unassigned connected component 633. This example provides a machine-encoded character that is expected to be comprised of a plurality of connected components.

Row 830 of the table shows a plurality of connected component and a recognised character forming a blob. Connected components 615-616 are associated with the machine-encoded character "2", which together form the blob. This blob is created by step S253A, for the situation in which step S252 provides an association with the unassigned connected component 616. This example provides a machine-encoded character that is expected to be comprised of a single connected component, although a plurality of connected components are in fact detected due to the low quality of the image.

Row 840 of the table shows a single connected component and a plurality of recognised characters forming a merged blob. Connected component 614 is associated with the machine-encoded characters "+3", which together form the blob. This blob is created by step S253B, for the situation in which the connected component 614 is determined to be associated with a plurality of recognised characters.

Row 850 of the table shows a single connected component and a plurality of recognised characters forming a plurality of split blobs. Connected component 614 is associated with the machine-encoded characters "+" and "3", which together form the blob. This blob is created by step S253C, for the situation in which the connected component 614 is determined to be associated with a plurality of recognised characters.

The above examples can also be realised by a computer of a system or apparatus (or devices such as a CPU or MPU) that reads out and executes a program recorded on a memory device to perform the functions of the above-described examples, and by a method, the steps of which are performed by a computer of a system or apparatus by, for example, reading out and executing a program recorded on a memory device to perform the functions of the above-described examples. For this purpose, the program is provided to the computer for example via a network or from a recording medium of various types serving as the memory device (e.g., a computer-readable medium such as a non-transitory computer-readable medium).

While the present invention has been described with reference to embodiments, it is to be understood that the invention is not limited to the disclosed embodiments. The present invention can be implemented in various forms without departing from the principal features of the present invention. The scope of the following claims is to be accorded the broadest interpretation so as to encompass all such modifications and equivalent structures and functions.

The invention claimed is:

1. An image processing system for localizing recognized characters in an image, comprising:
   a receiving unit configured to receive recognized characters obtained by performing character recognition of the image;
   an estimation unit configured to estimate a first location of a recognized character of said recognized characters;
   a determination unit configured to determine second locations of a plurality of connected components in the image, wherein a connected component is a group of connected pixels having the same color in a binarized image;
   a comparison unit configured to compare the first location and the second locations, to identify one or more connected components closest corresponding to the recognized character; and
   an association unit configured to map said one or more closest connected components to the recognized character thereby associating the recognized character with one or more connected components, and to modify said estimated first location of the recognized character based on the second locations of the associated one or more connected components.

2. The image processing system according to claim 1, wherein:
   the estimation unit;
   the determination unit;
   the comparison unit; and
   the association unit,
   are configured to perform their functions for each of a plurality of recognized characters.

3. The image processing system according to claim 1, further comprising:
   a memory configured to store, in association with the image, the recognized character and the second location of the identified connected component.

4. The image processing system according to claim 1, further comprising:
   at least one character recognition unit configured to perform character recognition of the image.

5. The image processing system according to claim 4, wherein:
   the at least one character recognition unit is configured to perform character recognition by making use of a neural network that has been trained to recognized a plurality of strings of characters.

6. The image processing system according to claim 1, further comprising:
   an augmentation unit configured to augment the image to include the recognized character at the second location.

7. The image processing system according to claim 1, wherein:
   the comparison unit is configured to identify the connected component having a second location that is closest to the first location of the recognized character.

8. The image processing system according to claim 7, wherein:
   the comparison unit is further configured to identify another connected component that is not associated with any recognized character, and identify the closest recognized character to the another connected component; and
   the association unit is further configured to associate the closest recognised character, the identified connected component of the closest recognised character, the another connected component, and the second location of the identified connected component.

9. The image processing system according to claim 1, wherein:
   if the connected component corresponds to a plurality of recognized characters:
   a splitting unit is configured to split the connected component into a plurality of parts;
   the comparison unit is configured to identify a location for each of the parts; and the association unit is configured, for each of the parts, to associate the recognized character, the part of the connected component, and the location of the part.

10. The image processing system according to claim 1, wherein:
the second location is a coordinate of the connected component.

11. The image processing system according to claim 1, wherein:
the second location is a bounding box that contains the connected component.

12. The image processing system according to claim 1, further comprising:
a display unit configured to display the image; and
a display controller configured to allow a user to select recognized characters by user selection at the second locations of the corresponding connected components within the image.

13. The image processing system according to claim 12, wherein:
the user selection is performed using a mouse, a touch screen, or a keyboard.

14. An image processing method for localizing recognized characters in an image, comprising:
receiving recognized characters obtained by performing character recognition of the image;
estimating a first location of a recognised recognized character that has been obtained by performing character recognition of the image;
determining second locations of a plurality of connected components in the image, wherein a connected component is a group of connected pixels having the same color in a binarized image;
comparing the first location and the second locations, to identify a one or more connected components closest to the recognized character;
mapping said one or more closest connected components to the recognized character thereby associating the recognized character with one or more connected components; and
modifying said estimated first location of the recognized character based on the second locations of the associated one or more connected components.

15. A non-transitory computer-readable medium storing a program that, when implemented by an image processing system, causes the image processing system to perform an image processing method for localizing recognized characters in an image, comprising:
receiving recognized characters obtained by performing character recognition of the image;
estimating a first location of a recognized character that has been obtained by performing character recognition of the image;
determining second locations of a plurality of connected components in the image, wherein a connected component is a group of connected pixels having the same color in a binarized image;
comparing the first location and the second locations, to identify one or more connected components closest to the recognized character;
mapping said one or more closest connected components to the recognized character thereby associating the recognized character with one or more connected components; and
modifying said estimated first location of the recognized character based on the second locations of the associated one or more connected components.

* * * * *